INVENTORS J. D. HEIGHTLEY
V. I. JOHANNES
J. S. MAYO
F. J. WITT
BY Leonard W. Arnold
ATTORNEY United States Patent Office 3,420,956

Patented Jan. 7, 1969

3,420,956

JITTER REDUCTION IN PULSE MULTIPLEXING SYSTEMS EMPLOYING PULSE STUFFING

John D. Heightley, Watchung, Virgil I. Johannes, Plainfield, and John S. Mayo, Berkeley Heights, N.J., and Francis J. Witt, Andover, Mass., assignors to Bell Telephone Laboratories Incorporated, New York, N.Y., a corporation of New York Filed Jan. 4, 1966, Ser. No. 518,674

U.S. Cl. 179—15 4 Claims

Int. Cl. H04j *1/00;* H04j *1/12;* H04l *7/00*

ABSTRACT OF THE DISCLOSURE

Apparatus at the receiving terminal of a PCM system employing pulse stuffing to eliminate the jitter associated with a reproduced signal derived from an elastic store due to the inability to stuff immediately at the transmitting terminal. A cancellation signal generator is employed at the receiving terminal and is driven by the inhibit pulses which delete the stuffed time slots from the output of the elastic store employed at the receiving terminal so that the generator produces an output voltage which falls linearly with a slope proportional to the average stuff rate and having a positive step discontinuity each time a stuffed time slot appears. The output of the cancellation signal generator constitutes the negative of the jitter component of the signal and is added to the phase comparator output of the elastic store with the result that the jitter associated with the received signal is eliminated.

This invention relates to multiplex pulse transmission systems and more particularly to such transmission systems which employ pulse stuffing techniques.

In the transmission systems described in United States Patent No. 3,136,861, issued to J. S. Mayo on June 9, 1964, and copending application Ser. No. 507,008, filed by V. I. Johannes and R. H. McCullough on Nov. 9, 1965 and assigned to the present assignee, dummy pulses are inserted or stuffed into the transmitted pulse sequence at discrete times to make up for small differences in pulse rates, or pulse frequencies, in order to effect synchronization. These dummy pulses are removed from the transmitted pulse stream at the receiving terminal and the time slot previously occupied by the dummy or stuffed pulse is closed. The fact that stuffing can only occur at discrete times means that there may be a waiting time between the crossing of a threshold level which indicates that stuffing should take place and the time when stuffing actually occurs. The result, as will be described below, is the introduction of a difficult to control jitter component of considerable amplitude on the output signal.

In somewhat more detail, the introducing of jitter on the output signal arises in the following manner. The coded information in such systems is written into an elastic store such as that shown in U.S. Patent No. 3,093,815, issued to M. Karnaugh on June 11, 1963, at the source pulse rate and is read out at a so-called multiplex clock rate which is usually equal to or a submultiple of the transmission line pulse repetition rate. The source rate is slightly lower than the multiplex clock rate so that information is read out of the store faster than it is written in in order to effect synchronization of the various pulse sources. If this situation continued, the elastic store would soon be depleted of information but the phase difference between the two rates is monitored by a phase comparator circuit which indicates how near the store is to being depleted. When the output of the phase comparator circuit after filtering crosses a predetermined threshold level indicating a predetermined phase difference between the two clocks, a synchronizing signal generator generates a stuff command signal. This stuff command signal is applied as an inhibit pulse to inhibit the multiplex clock signal so that the time slot on the line during which the inhibit pulse is present contains no information. This operation is called stuffing, and when the inhibit pulse occurs there will be a discontinuity in the output of the phase comparator corresponding to one time slot of the multiplex clock. As a result, the elastic store is replenished with information. If it were possible to immediately stuff whenever the phase comparator output of the elastic store crossed the threshold level, the phase comparator output of the elastic store would be a perfect saw-tooth wave form.

As described in the above-mentioned copending application, signaling sequences on a channel of the transmission line serve to inform the receiving apparatus to disregard time slots in which stuffing has occurred. Stuffing on any given channel can occur only once for each signaling sequence and the length of the sequence of pulses on the single signaling channel limits the rate at which stuffing can occur. The fact that stuffing can only occur at discrete times means that there may be, and usually is, a waiting period between the time when the output of the phase comparator crosses the threshold level and the time when stuffing actually occurs. The inability to stuff immediately when the output of the phase comparator crosses the threshold level gives rise to spurious components in the output of the phase comparator which have significant amplitudes. It may be shown that the output of the phase comparator resembles a saw-tooth wave form occurring at the stuffing rate with the addition of a spurious element associated with that wave form due to the inability to stuff immediately upon the crossing of the threshold level.

At the receiving terminal each so-called stuffed time slot must be removed in order to restore the information rate to its initial rate. To accomplish this result, at the receiver the incoming information is written into an elastic store at the multiplex rate under the control of a write clock gate. At the time of or prior to the transmission of a stuffed time slot a signal is transmitted from the transmitting terminal to the receiving terminal in a signaling channel which causes a so-called stuff pulse to be applied to the inhibit input terminal of the write clock gate during the reception of a stuffed time slot so that nothing is written into the store at that time. The output of the write clock gate is taken as the input of a phase locked loop comprising a phase comparator, low pass filter, and voltage controlled oscillator. The phase comparator monitors the difference in phase between the output of the store and its input, and its output is averaged to produce a direct current signal by the low pass filter. The direct current output of the filter in turn controls the frequency of the voltage controlled oscillator so that it is equal to the source frequency, and this signal is used to read the data out of the store. Since the information is read out at a rate equal to the source frequency the output of the phase comparator at the receiving terminal must be identical to the output of the phase comparator at the transmitting terminal. If stuffing were done only during stuffing intervals the output of the phase comparators would be perfect saw-tooth wave forms having a direct current component, and a high quality low pass filter could be used at the receiving terminal to average this signal and produce a reasonably steady direct current input to the voltage controlled oscillator. As a result the voltage controlled oscillator woud produce an output signal of reasonable constant frequency. Those alternating current components of the saw-tooth wave form which get through the filter and disturb the oscillator would probably be sufficiently small that in some applications they could be tolerated.

While the above described alternating current components or jitter might be tolerated in some circumstances, additional jitter is introduced at the transmitter due to the inability to stuff immediately when crossing the threshold level. In such situations the phase comparator output signals are not perfect saw-tooth wave forms. Frequently substantial components are added to the comparator output signal and make the output of the low pass filter in the phase locked loop at the receiving terminal vary substantially. As a result, the frequency of the voltage controlled oscillator varies and there is considerable jitter associated with the output signal at the receiving terminal.

It is an object of this invention to eliminate the jitter at the receiving terminal of a pulse multiplex transmission system employing pulse stuffing techniques.

In accordance with this invention, a negative version of the alternating current component of the phase comparator output having a different direct current component than the phase comparator output is artifically constituted and used to cancel the alternating current component of the signal from the phase comparator output of the elastic store at the receiving terminal, leaving only a substantially direct current output signal to filter and apply to the voltage controlled oscillator so that jitter in the frequency of its output signal is substantially reduced. A cancellation signal generator is used to constitute the alternating current component of the phase comparator output, producing a signal whose output voltage falls linearly with a slope proportional to the average stuff rate and which has a positive going discontinuity each time a stuff inhibit pulse occurs. The alternating current output of the cancellation signal generator is equal to the negative of the alternating current output of the phase comparator at the receiver but has a different direct current component, and is added to the output of the phase comparator at the receiver. As a result, a substantially direct current is produced to control the voltage controlled oscillator, the output of which is then substantially free of jitter. Apparatus in accordance with this invention is thus effective to reduce jitter whether the source of jitter is a deficiency in the low pass filter at the receiver in passing alternating current components of a perfect saw-tooth wave form or the presence of jitter components due to the inability to stuff immediately, or both.

This invention will be more fully comprehended from the following detailed description taken in conjunction with the drawings in which.

Figures 1, 2, 3:
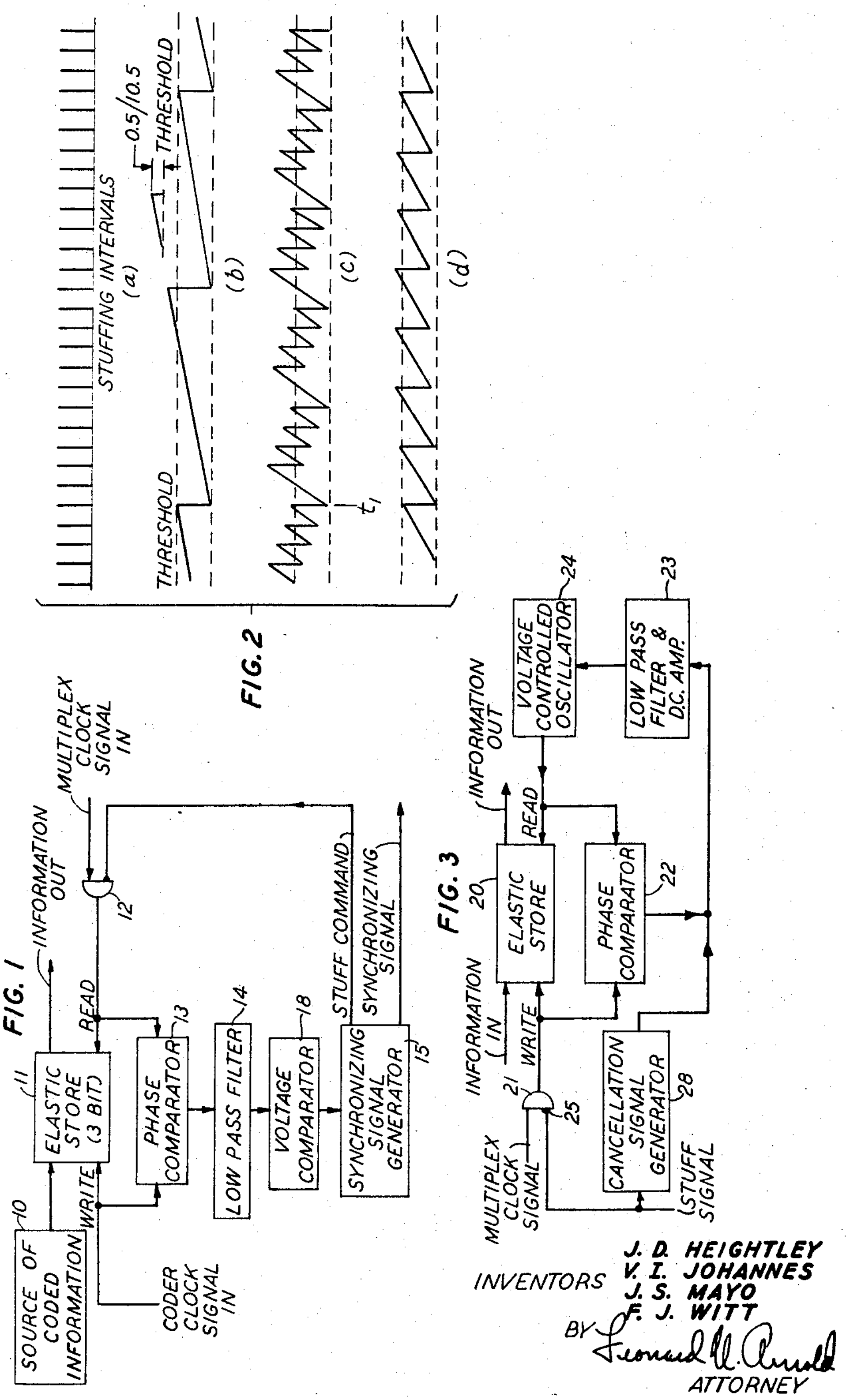
FIG. 1 is a block diagram of the transmitter of a multiplex pulse transmission system employing pulse stuffing techniques.
FIG. 2 is a series of wave forms useful in understanding the origin of jitter in the signal.
FIG. 3 is a block diagram of a receiver embodying the invention.

The transmitting terminal of a pulse multiplex transmission system employing pulse stuffing, such as that described in the above-mentioned copending application, is shown in block diagram form in FIG. 1. The coded information to be transmitted is applied to the input terminal of an elastic store 11 under the control of a coder clock signal and is read out of the elastic store under the control of the multiplex clock signal. The multiplex clock signal is derived from the transmission line clock signal and is applied to the read terminal of the elastic store 11 by means of an inhibit gate 12.

The rate of the coder clock signal is slightly lower than the rate of the multiplex clock signal so that information is read out of the elastic store faster than it is written in. The phase difference between these two clock signals is monitored by a phase comparator circuit 13 whose output signal is averaged by a low pass filter 14. When the output of filter 14 reaches a predetermined level, indicating that a predetermined quantity of data is stored in store 11, a voltage comparator, or threshold detector circuit, 18 generates an output signal which is applied to a synchronizing signal generator 15. The synchronizing signal generator 15 then generates a stuff command signal which is applied to the inhibit terminal of gate 12 to inhibit the read out of the elastic store 11 so that the time slot or pulse period on the transmission line during which the inhibit pulse is present contains no information. This operation is called pulse stuffing. At the time that the inhibit pulse occurs there is, as a result of the stuffing, a discontinuity in the output of the phase comparator corresponding to one time slot of the multiplex clock signal and the elastic store 10 is replenished with information.

The synchronizing signal generator also generates a synchronizing signal which is applied to the transmission line during predetermined pulse periods to signal to the receiving apparatus that pulse stuffing has occurred and to disregard a particular time slot. Generally speaking, this signaling is done by means of a single channel on the high speed line and is sent as a redundantly coded sequence of pulses. The actual stuffing of any given channel can only occur once for each signaling sequence which means that stuffing can occur only at discrete times and that there may be a waiting time between the generation of an output signal by phase comparator 13, indicating that stuffing should occur and the time when stuffing actually occurs.

The inability to stuff immediately when the filtered output of the phase comparator circuit 13 crosses a predetermined threshold level as determined by comparator circuit 18 gives rise to components in the output of the phase comparator which result in substantial distortion of the ideal saw-tooth phase comparator output wave form. This may be shown by reference to FIG. 2 in which line *a* represents those pulse periods or time slots on the transmission line for which pulse stuffing is permissible for a particular source of coded information. In line *b* the output signal from the phase comparator 13 is depicted for an illustrative example when the maximum pulse stuffing rate is 10.5 times the frequency difference of the multiplex and coder clock signals. The separation of the two broken lines in line *b* represents the difference in output of the phase comparator 13 corresponding to one time slot. The phase comparator, in the illustrative example shown in line *b*, first reaches the predetermined threshold level in one of the permissible time slots in which stuffing can occur and stuffing therefore immediately occurs, causing a discontinuity corresponding to one time slot. The output of the phase comparator then rises linearly and reaches the threshold level 10.5 stuffing intervals after the preceding intersection with the threshold level. Since stuffing cannot occur until one-half a stuffing interval later, the output of the phase comparator overshoots the threshold level by an amount corresponding to 0.5/10.5 or 0.05 time slots before stuffing occurs. The resulting overshoot is illustrated by the triangular wave form enlargement of this overshoot shown slightly above and to the right of the second intersection of the comparator output with the threshold level. A discontinuity corresponding to one time slot occurs in the output of the phase comparator and the next intersection with the threshold level will be 10.5 stuffing intervals later, meaning 21 stuffing intervals after the first intersection. This time again coincides with one of the permissible stuffing slots so that stuffing occurs immediately upon reaching the threshold. The pattern now repeats. It is apparent that the saw-tooth wave form occurring at the stuffing rate is being distorted due to the inability to stuff immediately and that there is a spurious envelope associated with that wave form which in this simple illustrative example has an amplitude of 0.05 time slots and a frequency of half the stuffing rate.

In line *c* of FIG. 2 another illustrative example is shown. Here the maximum stuff rate is 1.25 times the difference frequency between the multiplex clock signal and the coder clock signal. At time $t_1$ the comparator output crosses the threshold level during the occurrence of one of the permissible time slots or stuffing intervals in which stuffing may occur. The output of the phase comparator rises and crosses the threshold level 1.25 intervals after the preceding intersection. Since this discontinuity is equal to the separation of the two lines, each intersection must be separated from the preceding intersection by 1.25 stuffing intervals. Thus, the fourth intersection will again be at one of the permissible stuffing intervals and the pattern repeats. In this situation the envelope associated with the phase comparator output has an amplitude corresponding to 0.6 of a time slot and a frequency one-fourth of the actual stuff rate.

The wave form in line *d* of FIG. 2 represents still another illustrative example in which the envelope rises in voltage beyond the threshold level and in which the amplitude of the spurious envelope is approximately one-third of a time slot and has a frequency one-tenth of the actual stuff rate. The important factor concerning the wave form shown in lines *b*, *c*, and *d* of FIG. 2 is that the inability to stuff immediately upon crossing the threshold can give rise to spurious components in the output of the phase comparator, these spurious components having frequencies below the actual stuff rate and significant amplitudes. It may be shown that as the actual stuff rate approaches the $n^{\text{th}}{}_{\text{harmonic}}$ of the maximum permissible stuff rate, the frequency of the envelope approaches zero while the amplitude approaches $1/n$ time slots. These low frequency components give rise to difficult to control jitter at the receiver when the stuffed time slot is removed.

The stuffed time slot must be removed at the receiving terminal in order to restore the coded information to its initial rate and the manner in which this is done is illustrated in block diagram form in FIG. 3. The transmitted information from a particular channel is written into an elastic store 20 under the control of a multiplex clock signal which is transmitted through an inhibit gate 21 to the write terminal of the elastic store. When a stuff time slot occurs a synchronizing signal is transmitted from the transmitting apparatus and this signal causes a stuff signal to be generated at the receiving terminal for application to the inhibit input terminal 25 of inhibit gate 21 so that no signal is written into the elastic store at that time. The output of the inhibit gate 21 is used as the input signal of a phase locked loop comprising phase comparator 22, low pass filter and D-C amplifier 23 and voltage control oscillator 24. The function of this phase locked loop is to control the output frequency of the voltage controlled oscillator 24 so that it is equal to the source frequency. The voltage controlled oscillator 24 in turn controls the read out of the elastic store and as a result the information will be read out at a constant frequency which is equal to the source frequency. It follows that the output of the phase comparator 22 in FIG. 3 must then be identical to the output of the phase comparator 13 at the transmitting terminal and as a result there may be substantial jitter components present, as graphically illustrated in lines *b*, *c*, and *d* of FIG. 2 and discussed above.

In accordance with this invention, jitter components, whether they are present primarily because of the inability of the low pass filter at the receiving terminal to eliminate them even when stuffing is not delayed, or are present primarily because of the inability to stuff immediately or for both reasons are eliminated by artificially constituting the alternating current component of the output signal of the phase comparator 22 and adding that signal to the output of the phase comparator to eliminate the alternating current signal. Because the direct current levels of the phase comparator output and that of the artificially constituted signal are different this addition leaves only a direct current signal whose amplitude is such that it maintains the frequency of oscillator 24 equal to the source frequency.

More specifically, in response to the generation of stuff signals at the receiver a cancellation signal generator produces a signal whose output voltage falls linearly with a slope proportional to the average stuff rate and which has a positive going discontinuity each time a stuff signal occurs. The output of the cancellation signal generator is equal to the negative of the alternating current output of the phase comparator at the receiver but has a different direct current component and in accordance with this invention is added to the output of the phase comparator at the receiver with the result that substantially all the alternating current components are removed. Only a direct current signal remains and the phase locked loop adjusts that direct current level so that information is read out at the rate of the source.

The cancellation signal generator 28 is added to the receiving apparatus shown in FIG. 3 to accomplish this result. The input to the cancellation signal generator is the stuff signal, which, as stated above, is generated at the receiving apparatus in response to the synchronizing signal and the output of the cancellation signal generator is directly connected to the output of the phase comparator 22.

Figures 4, 5:
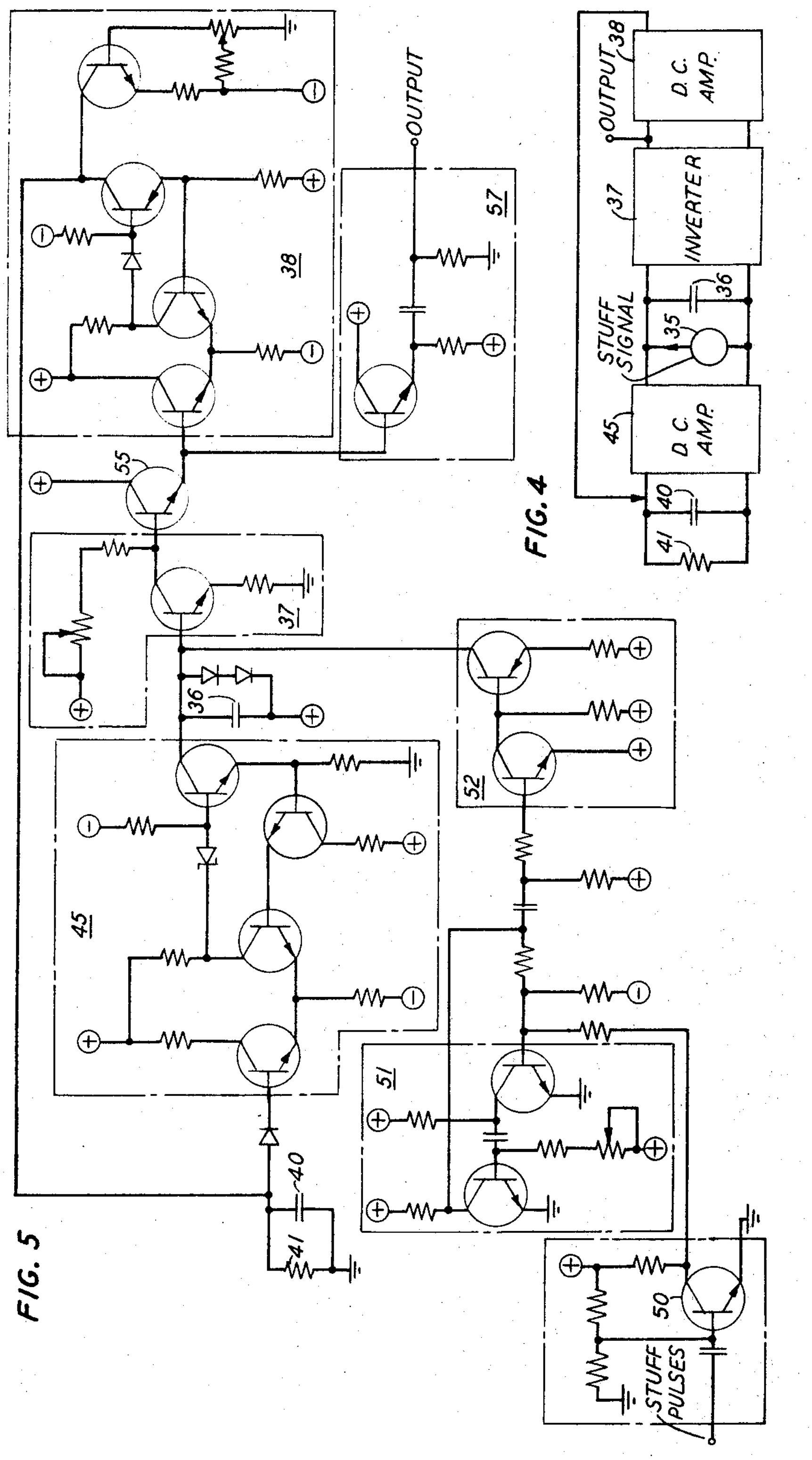
FIG. 4 is a block diagram of a cancellation signal generator.
FIG. 5 is a schematic diagram of a cancellation signal generator.

A block diagram of the cancellation signal generator is shown in FIG. 4. The source 35 of stuff signals is the signal generated to inhibit gate 21 in response to transmitted signaling information and this signal is applied to a capacitor 36 connected across the input terminals of an inverter circuit 37. The source 35 applies a high current pulse to the capacitor each time an inhibit signal occurs and this causes an abrupt discontinuity in the voltage across the capacitor equal to the discontinuity in the output of the phase comparator when stuffing occurs. The signal developed across capacitor 36 is, as will be shown, equal to the output of the phase comparator and in order for this to be true currents must be drawn away from the capacitor 36 at a rate proportional to the average stuff rate so that the voltage of the capacitor declines linearly between stuffing intervals. To accomplish this end, the signal across capacitor 36 is inverted by inverter circuit 37 and applied to a D-C amplifier circuit 38 and then fed back to a low pass filter circuit comprising capacitor 40 and resistor 41. The function of the low pass filter is to remove any time variations from the current fed back from amplifier 38 to amplifier 45. The voltage across the low pass filter circuit is applied to the input terminals of a D-C amplifier 45 whose input voltage determines the current drawn at its output terminals. Thus, in response to the output voltage of the low pass filter, the D-C amplifier 45 drains current away from capacitor 36 so that the voltage across capacitor 36 decreases linearly at a rate proportional to the average stuff rate. As a result, the alternating current output of the inverter circuit 37 is equal to the alternating current output of the phase comparator 22 at the receiving terminal. In accordance with this invention adding the output of the cancellation signal generator to that of the phase comparator at the receiver results in an output signal having substantially no jitter since all alternating current components of the input signal to filter 23 have been removed. The phase locked circuit then functions to maintain the direct current signals at such a level that the information is read out at the source rate.

A schematic diagram of a cancellation signal generator is shown in FIG. 5. The stuff pulses are applied to a transistor amplifier circuit 50 which isolates the source of stuffing pulses from the cancellation signal generator and in addition inverts the stuff signal. The inverted stuff signal is then applied to a monostable multivibrator 51 where the stuff pulse is widened to facilitate the use of slower speed and less costly circuitry in following stages. The output signal from the monostable multivibrator 51 is then applied to a two transistor power amplifier circuit 52 which is desirable to provide sufficient current capability to charge the capacitor 36 so that an abrupt discontinuity appears across the capacitor output terminals each time pulse stuffing occurs. The voltage across capacitor 36 is applied to inverter circuit 37 whose output signal is applied by way of an emitter follower 55 to an emitter follower circuit 55 which is used to drive the direct current amplifier 38. In addition, the output of emitter follower circuit 55 is used to drive a second emitter follower circuit 57 at whose emitter the output signal appears. Feedback is provided from the D-C amplifier 38 to the low pass filter comprising capacitor 40 and resistor 41 which is connected to the input of a four transistor D-C amplifier 45 whose output draws current away from capacitor 36 at a rate proportional to the input voltage.

Thus, in accordance with this invention a negative version of the alternating current component of the phase comparator output is artificially constituted and used to cancel the alternating current component of the signal from the phase comparator output of the elastic store at the receiving terminal, leaving only a substantially direct current output signal to filter so that jitter in the frequency of its output signal is substantially reduced. A receiver embodying this invention is thus able to overcome the jitter found in pulse multiplexing systems in which pulse stuffing can only be accomplished at discrete times, but even in the absence of such jitter greatly reduces the requirements of the low pass filter in the phase locked loop at the receiving terminal due to the substantial elimination of all the alternating current components at its input.

It is to be understood that the above described arrangements are merely illustrative of the application of the principles of the invention. Numerous other arrangements may be devised by those skilled in the art without departing from the spirit and scope of the invention.

What is claimed is:

1. In a pulse code modulation transmission system employing pulse stuffing techniques utilizing an elastic store at a transmitting terminal to stuff predetermined time slots when necessary to effect the synchronization of signals from a plurality of sources and an elastic store at a receiving terminal having a read terminal, a write terminal, an input terminal and an output terminal, pulse information being stored in said store and pulses deleted in response to transmitted signaling information, means at said receiving terminal for removing jitter from the reproduced signal comprising, in combintion, a voltage controlled oscillator, a phase comparator connected to said read and write terminals of said store so that the output signal from said phase comparator is a signal which represents the difference in phase between the signals at the read and write terminals of said store, means connecting said voltage controlled oscillator in a phase locked loop between the read terminal of said store and the phase comparator output, generating means to generate in response to said signaling information a signal having the same alternating current component and a different direct current component as the signal at the output of said phase comparator, and means to combine the signal generated by said generating means with the phase comparator output of said elastic store at said receiving terminal.

2. In a pulse code modulation transmission system employing pulse stuffing techniques utilizing an elastic store at a transmitting terminal to stuff predetermined time slots when necessary to effect the synchronization of signals from a plurality of sources and an elastic store at a receiving terminal having a read terminal, a write terminal, an input terminal, and an output terminal, pulse information being stored in said store and pulses deleted in response to transmitted signaling information, means at said receiving terminal for removing jitter from the reproduced signal comprising, in combination, a voltage controlled oscillator, a phase comparator connected to said read and write terminals of said store so that the output of the phase comparator is a signal which rises linearly at a rate equal to the average rate at which pulses are stuffed and has a negative step discontinuity each time such stuffing occurs, and represents the difference in phase between the signals at the read and write terminals of said store, means connecting said voltage controlled oscillator in a phase locked loop between the read terminal of said store and the phase comparator output, generating means to generate in response to said signaling information a signal which declines linearly with a slope equal to the average rate at which time slots are stuffed at said transmitting terminal and which has an abrupt positive step discontinuity in response to the transmission of signal information indicating that a stuffed time slot has been transmitted, and means to add the signal generated by said generating means with the phase comparator output of said elastic store at said receiving terminal.

3. Apparatus in accordance with claim 1 in which said generating means at said receiving terminal comprises, in combination, charge storage means, means for applying a burst of current to said storage means in response to signaling information transmitted over said signaling channel indicating that a stuffed time slot has been transmitted, and means connected to said storage means to discharge said storage means at a substantially linear rate proportional to the average rate at which stuffed time slots are transmitted.

4. Apparatus in accordance with claim 1 in which said generating means at said receiving terminal comprises a capacitor, means to abruptly charge said capacitor each time a stuffed time slot is transmitted, means to invert the output signal across said capacitor, amplifying means to amplify the inverted output signal from said capacitor, second amplifying means connected across said capacitor to draw current from said capacitor in response to an input signal applied to said second amplifier, and a low pass resistance-capacitance filter connected between the output of said first amplifier and the input of said second amplifier so that the output voltage at said inverting means is the negative of a voltage proportional to the average stuff rate.

References Cited

UNITED STATES PATENTS 3,136,861 6/1964 Mayo ---------------- 179—15

ROBERT L. GRIFFIN, *Primary Examiner.*

WILLIAM S. FROMMER, *Assistant Examiner.*

U.S. Cl. X.R.

178—69.5; 325—42, 65, 323, 473